(12) United States Patent
Chuan-Yu et al.

(10) Patent No.: US 6,304,343 B1
(45) Date of Patent: Oct. 16, 2001

(54) DUST-PROOF MECHANISM FOR OPTICAL REFLECTION MODULE OF IMAGE SCANNER

(75) Inventors: Hsu Chuan-Yu, Hsinchu Hsien; Huang Chih-Wen, Hsinchu, both of (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 09/243,125

(22) Filed: Feb. 3, 1999

(51) Int. Cl.[7] ....................................................... H04N 1/04
(52) U.S. Cl. ............................................. 358/474; 358/400
(58) Field of Search .................................. 358/400, 474, 358/500; 382/312, 315; 399/380; 359/17

(56) References Cited

U.S. PATENT DOCUMENTS 6,029,028 * 2/2000 Inoue ....................................... 399/92
6,031,640 * 2/2000 Chou ...................................... 358/498

* cited by examiner

Primary Examiner—Jerome Grant, II
(74) Attorney, Agent, or Firm—Dougherty & Troxell

(57) ABSTRACT

A dust-proof mechanism for optical reflection module of an image scanner is disclosed. The dust-proof plate is disposed at an open area of the optical reflection module. Each lateral end of the dust-proof plate is disposed with a shaft rod pivotally fitted in a shaft hole formed on a lateral inner wall of the optical reflection module. The direction of the dust-proof plate is parallel to the direction of the reflection mirror of the optical reflection module. When the scanner performs the scanning operation, the dust-proof plate is positioned at an opened position. When the scanner does not perform the scanning operation, the dust-proof plate shields the open area of the optical reflection module so as to isolate suspending dust from passing through the open area of the optical reflection module and attaching to the mirror surface of the reflection mirror.

5 Claims, 7 Drawing Sheets

DUST-PROOF MECHANISM FOR OPTICAL REFLECTION MODULE OF IMAGE SCANNER

BACKGROUND OF THE INVENTION

1. Field of the Invention

The present invention relates to a dust-proof mechanism for an image scanner, and more particularly to a dust-proof mechanism for optical reflection module of the image scanner.

2. Description of the Prior Art

In an image scanner, the scanned light beam is reflected by an optical reflection module arranged in the scanner to form an image through an optical lens. Typically, a Charge Coupling Device (CCD) is used to convert the optical signal of the image into digital signal which can be memorized and processed by a computer. In a commercial scanner product, due to the limitation of the length of the optical path required in forming the image, generally the optical reflection module includes several reflection mirrors (for example, three or four glass mirrors) for several times reflecting the light beam so as to effectively reduce the dimension of the scanner.

FIG. 1 shows a conventional image scanner including a housing 1 and an upper cover board 2. The scanner comprises a light transmittable document positioning plate 11 which is a plane surface made of for example glass or other light transmittable, substantially rigid material, for supporting a document to be scanned (not shown), defining a document scanning widow.

FIG. 2 shows the arrangement of the internal components of the conventional image scanner. The housing 1 encloses circuit components, optical components and mechanical components of the scanner, including two parallel guide rods 31, 32, a first optical reflection module 4, a second optical reflection module 5, an optical lens 6, and a Charge Coupling Device 7. The first and second optical reflection modules 4 and 5 are driven by a driving mechanism and transmission mechanism, such as a belt, to slide along the guide rods 31, 32 so as to control the optical path during scanning operation.

The first optical reflection module 4 includes a module frame 40 and an upper and a lower reflection mirrors 41, 42 arranged in the module frame 40. The two reflection mirrors are arranged opposite to each other to contain an angle for reflecting the light beam. The front side of the optical reflection module frame 40 facing the second optical reflection module 5 is formed with an open area.

After a long period of operation of the scanner, it often takes place that suspending dust attaches to the mirror surface of the optical reflection module, especially in an optical reflection module frame with open area. The lower mirrors 42 of the first optical reflection module 4 is such arranged that the mirror surface is oriented upward, so that the suspending dust is most apt to attach to the mirror surface thereof. Once the dust attaches to the surface, a problem of poor scanned image will take place. For example, straight stripes will be formed on the image. In order to achieve a best quality of the scanned image, it is necessary to provide a dust-proof mechanism so as to isolate or reduce the suspending dust attaching to the mirror surface.

SUMMARY OF THE INVENTION

It is therefore a primary object of the present invention to provide a dust-proof mechanism for optical reflection module of an image scanner. When the scanner normally performs the scanning operation, the dust-proof mechanism is positioned at an opened position without interrupting the scanned light beam. However, when the scanning operation is completed, the dust-proof mechanism shields the open area of the optical reflection module frame so as to isolate or reduce suspending dust which may pass through the open area of the optical reflection module frame to attach to mirror surface of the optical reflection module.

It is a further object of the present invention to provide the above dust-proof mechanism which includes a dust-proof plate disposed at the open area of the optical reflection module frame. Each lateral end of the dust-proof plate is disposed with a shaft rod pivotally fitted in a shaft hole formed on a lateral inner wall of the optical reflection module frame. The direction of the dust-proof plate is parallel to the direction of the mirror surface of the optical reflection module. The dust-proof plate is driven by a driving unit to position at a shielding position or an opened position.

To further understand the present invention, reference is made to the following detailed description of a preferred embodiment of the present invention, as well as the attached drawings, wherein:

DETAILED DESCRIPTION OF THE PREFERRED EMBODIMENTS

Figure 1:
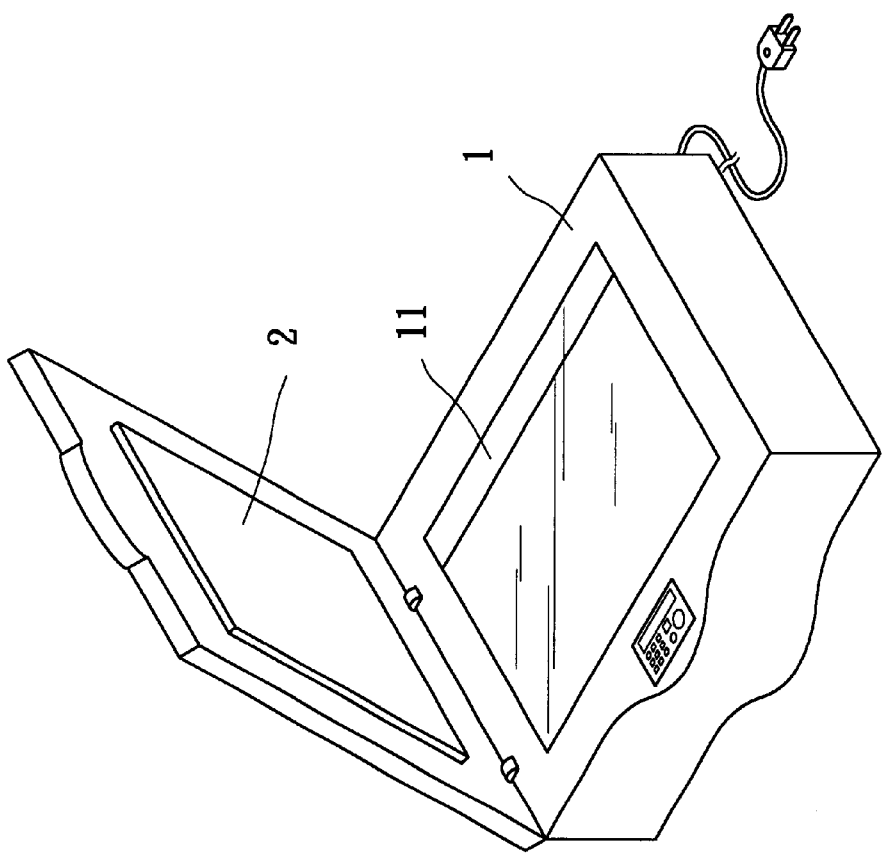
FIG. 1 is a perspective view of a conventional image scanner.
Figure 2:
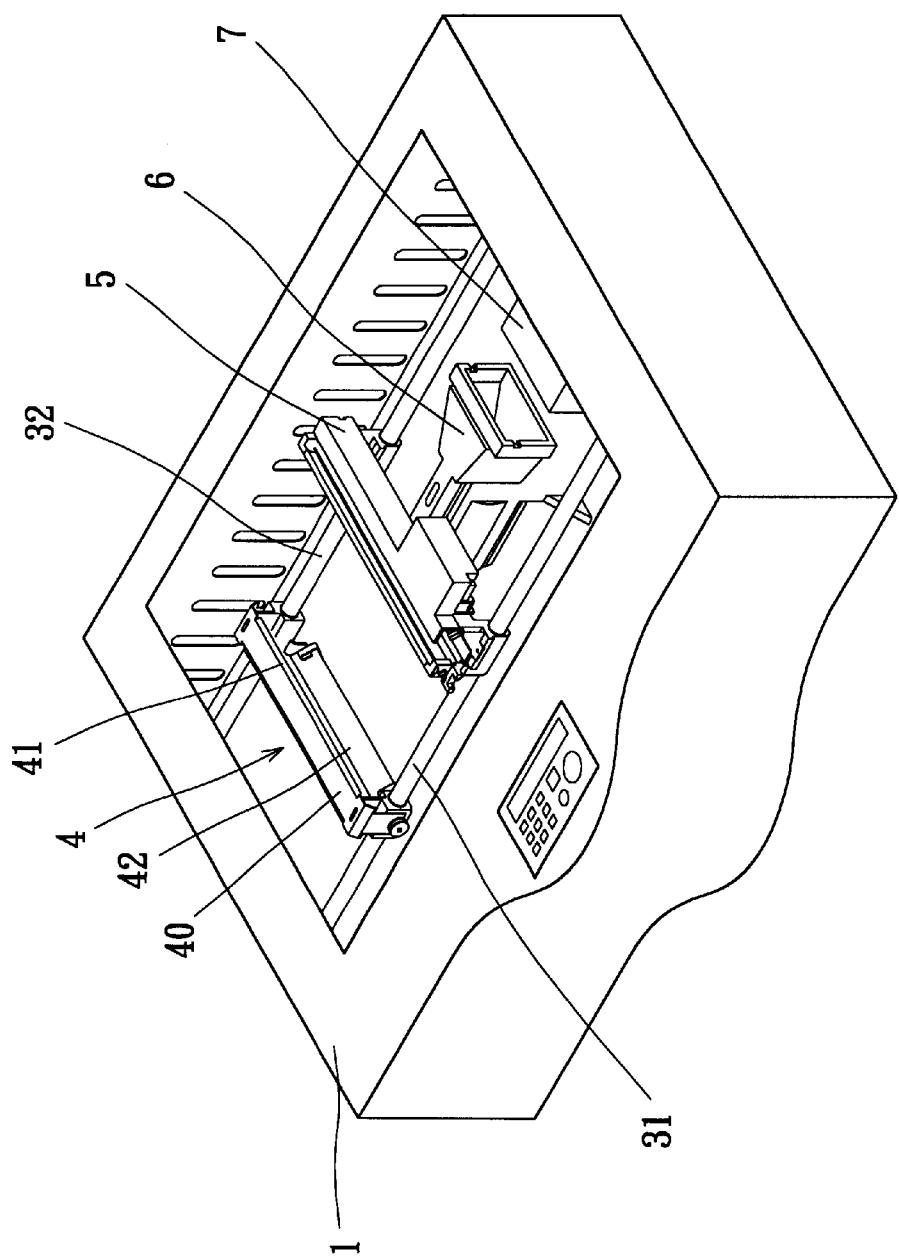
FIG. 2 is a perspective view showing the arrangement of the internal components of the conventional image scanner.
Figure 3B:
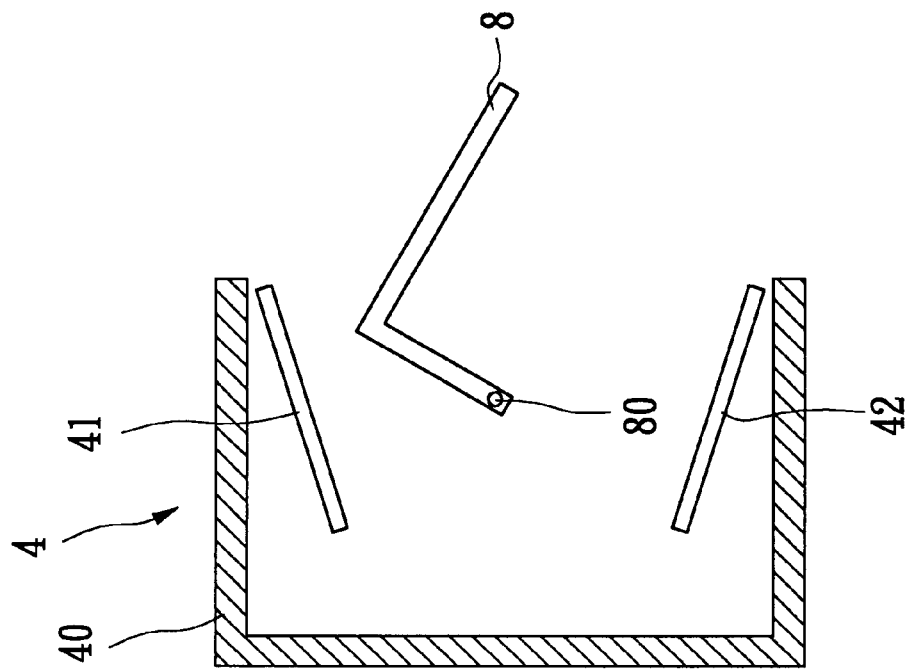
FIG. 3B is a side view showing a dust-proof plate is disposed in the optical reflection module in accordance with the present invention, in which the dust-proof plate is positioned at an opened position.
Figure 3A:
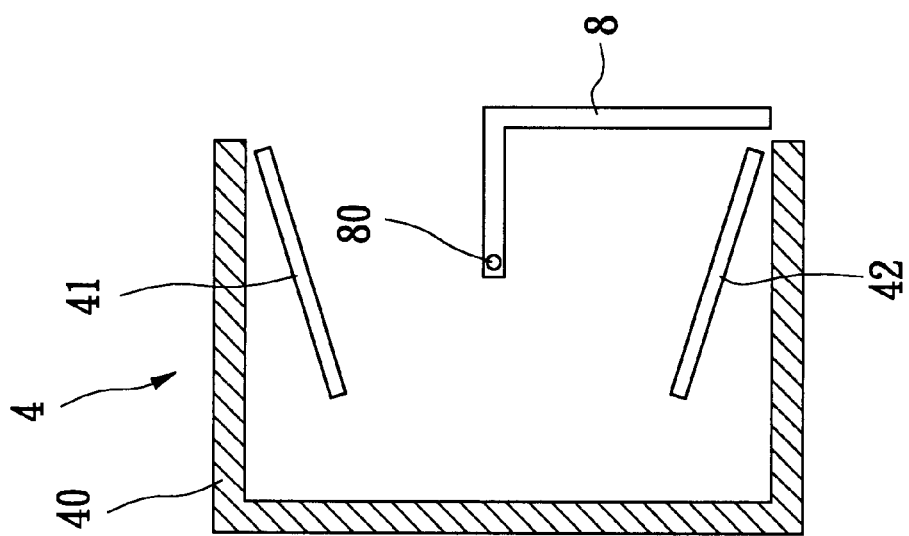
FIG. 3A is a side view showing a dust-proof plate is disposed in the optical reflection module in accordance with the present invention, in which the dust-proof plate is positioned at a shielding position.

The dust-proof mechanism of the present invention serves to isolate or reduce the suspending dust through an open area of an optical reflection module of a scanner. Please refer to FIGS. 3A and 3B. FIG. 3A is a side view showing that a dust-proof plate 8 is disposed in a frame 40 of a first optical reflection module 4, wherein the dust-proof plate 8 is positioned at a shielding position. FIG. 3B shows that the dust-proof plate 8 is positioned at an opened position.

The dust-proof plate 8 includes a shaft rod 80 serving as a rotary center. The opening/shielding of the dust-proof plate 8 is controlled by a driving means (not shown). When the scanner does not perform scanning operation, the dust-proof plate 8 is positioned at the shielding position as shown in FIG. 3A so as to isolate or reduce the suspending dust attaching to the mirror surface of a lower mirror 42. When the scanner performs the scanning operation, the dust-proof plate 8 is upward rotated about the shaft rod 80 to the opened position as shown in FIG. 3B so as not to interrupt the reflected light beam.

Figure 4A:
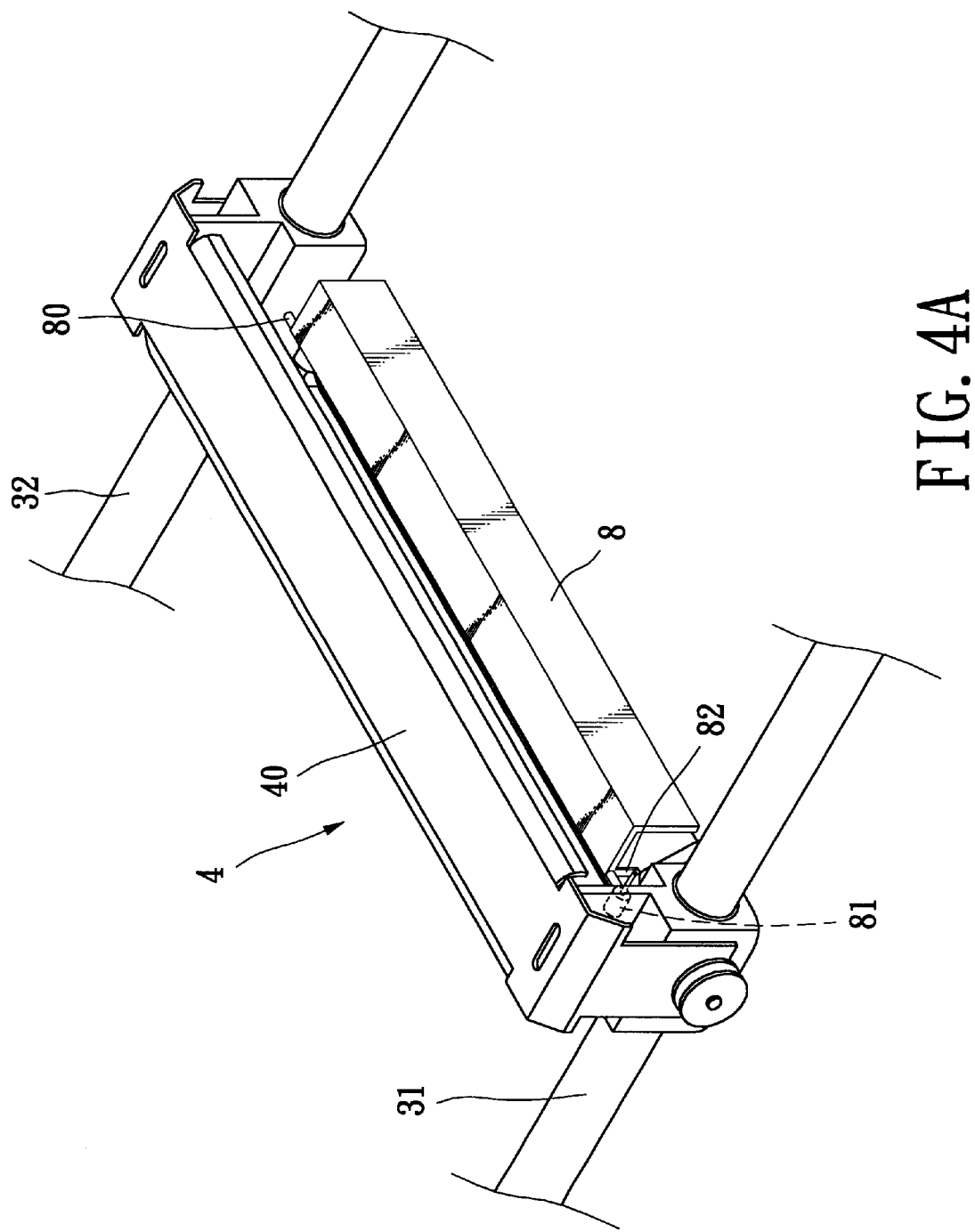
FIG. 4A is a perspective view of a first embodiment of the present invention, in which the dust-proof plate is mounted on the optical reflection module.
Figure 4B:
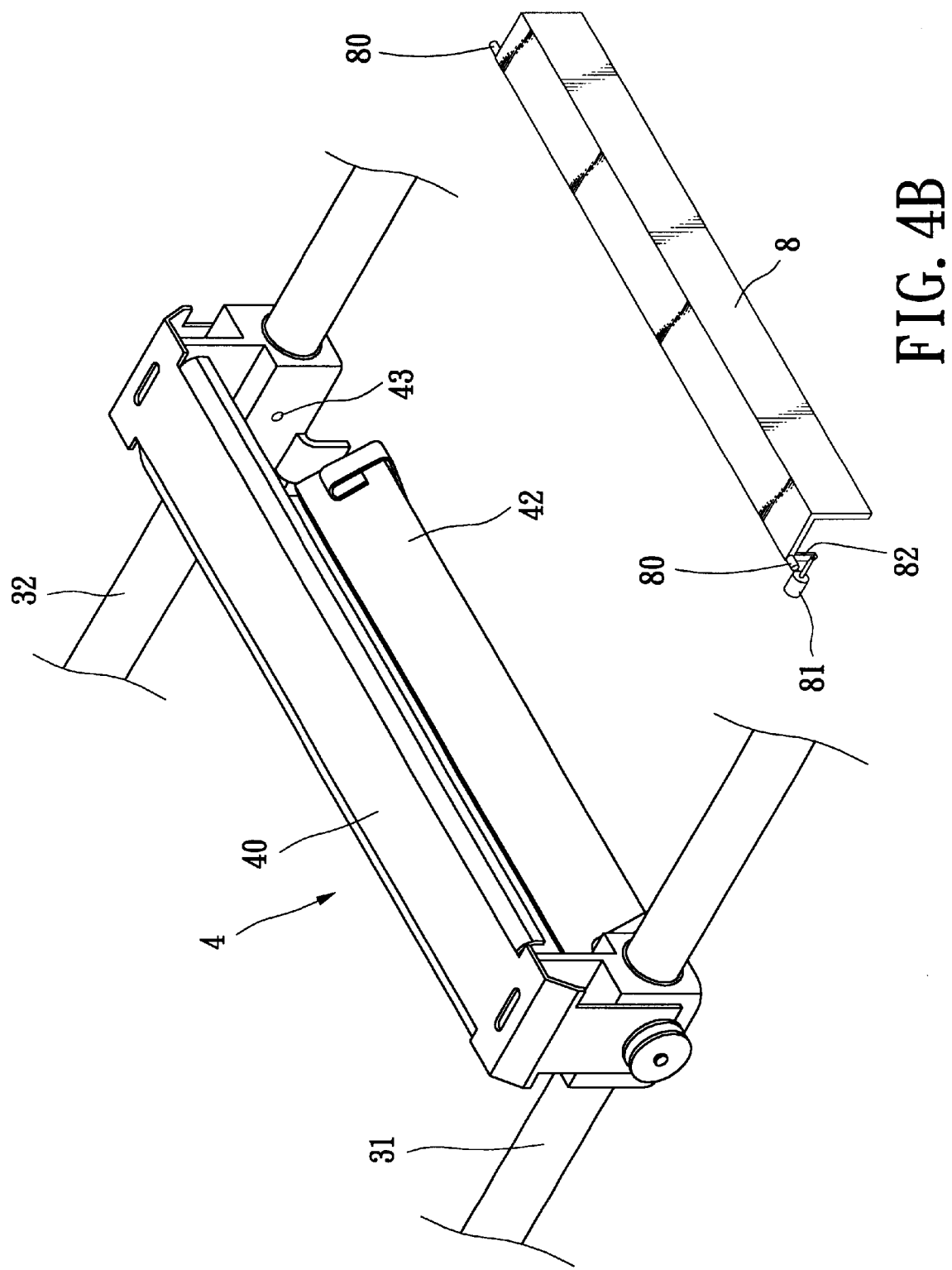
FIG. 4B is a perspective view of the first embodiment of the present invention, in which the dust-proof plate is separated from the optical reflection module.

FIG. 4A shows a first embodiment of the present invention in which the dust-proof plate 8 is connected with the frame 40 of the first optical reflection module 4. FIG. 4B shows that the dust-proof plate 8 is disassembled from the frame 40. In this embodiment, the dust-proof plate 8 is in a form of L-shaped structure disposed at a front open area of the frame 40. Each lateral end of the dust-proof plate 8 has a shaft rod 80 pivotally fitted in a shaft hole 43 formed on the inner lateral wall of the frame 40.

However, the dust-proof plate 8 can be located at the front open area of the frame 40 by other conventional structure (such as a support rack). After the assembling procedure is completed, the direction of the dustproof plate 8 is parallel to the direction of the mirror surface 42 of the first optical reflection module 4.

In order to control the shielding/opening of the dust-proof plate 8, the present invention includes a driving means composed of a driving unit 81 (such as an electromagnetic driver or other similar driving elements) and a linking lever 82 serving as a transmission element connected between the driving unit 81 and the dust-proof plate 8. Therefore, the driving force generated by the driving unit 81 can be transmitted to the dust-proof plate 8 to drive the same toward the shielding position or opened position.

Figure 5A:
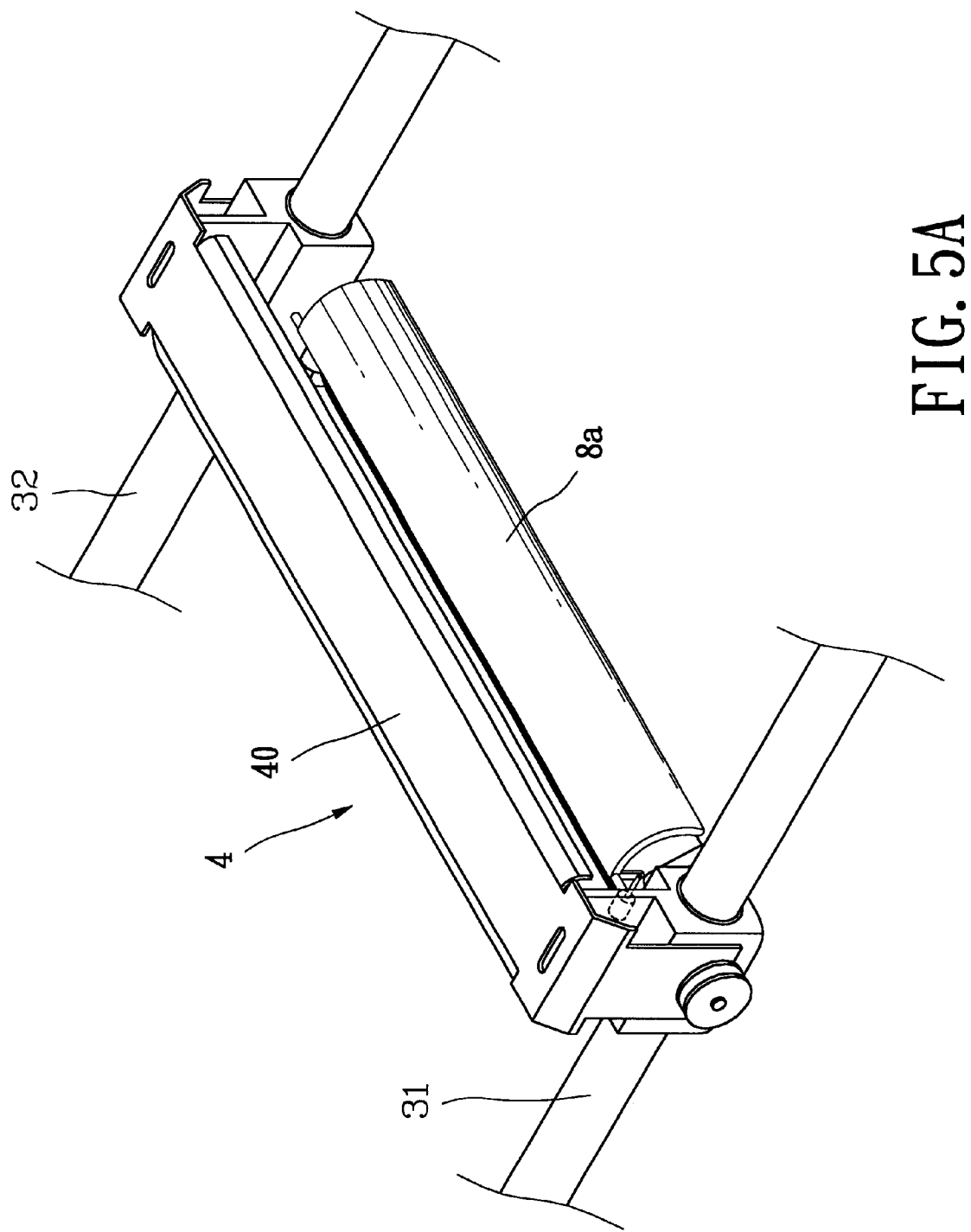
FIG. 5A is a perspective view of a second embodiment of the present invention, in which the dust-proof plate is mounted on the optical reflection module.
Figure 5B:
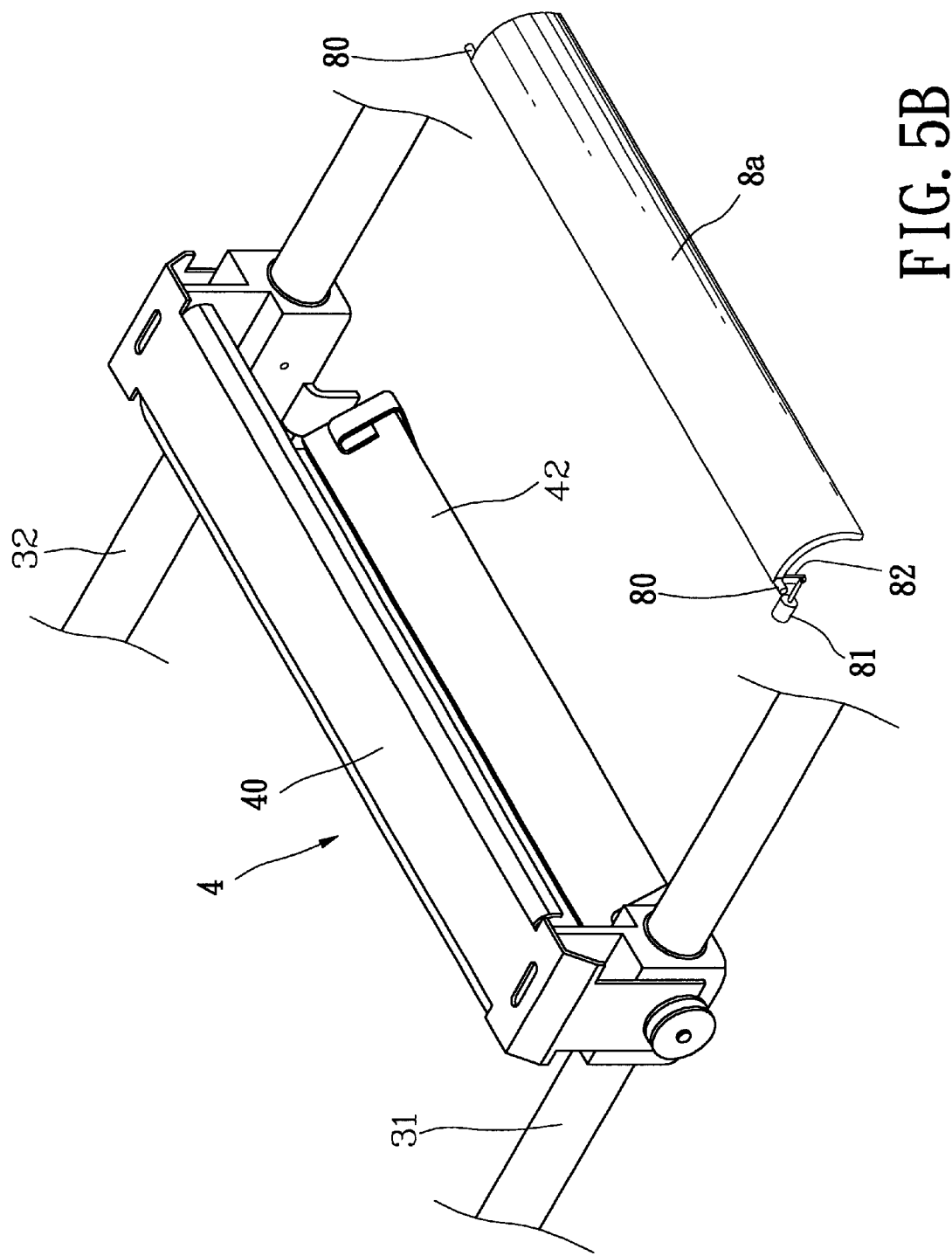
FIG. 5B is a perspective view of the second embodiment of the present invention, in which the dust-proof plate is separated from the optical reflection module.

FIGS. 5A and 5B show a second embodiment of the dust-proof plate of the present invention. The only difference between the second embodiment and the first embodiment described above resides in that the dust-proof plate 8 is an arched structure 8a which achieves the same dust-proof function as the L-shaped dust-proof plate 8 of the first embodiment.

It is to be understood that the above description and drawings are only used for illustrating some embodiments of the present invention, not intended to limit the scope thereof. Any variation and derivation from the above description and drawings should be included in the scope of the present invention. For example, the dust-proof plate can be any other suitable form and the driving means can be other suitable driving mechanisms.

What is claimed is:

1. A dust-proof mechanism for an optical reflection module of an image scanner for isolating dust from passing through an open area of the optical reflection module and attaching to a reflection mirror mounted in the optical reflection module, the dust-proof mechanism comprising:

a dust-proof plate disposed at the open area of the optical reflection module;

a driving unit for generating a driving force; and a transmission member connected between the driving unit and the dust-proof plate for transmitting the driving force generated by the driving unit to the dust-proof plate;

wherein the dust-proof plate shields the open area of the optical reflection module when the scanner does not perform scanning operation, while when the scanner performs the scanning operation, the dust-proof plate is positioned at an opened position wherein the dust-proof plate is provided with two shaft rods pivotally mounted on the optical reflection module, the dust-proof being parallel to the mirror of the optical reflection module.

2. The dust-proof mechanism as claimed in claim 1, wherein the dust-proof plate is an L-shaped structure.

3. The dust-proof mechanism as claimed in claim 1, wherein the dust-proof plate is an arched structure.

4. The dust-proof mechanism as claimed in claim 1, wherein the driving unit is an electromagnetic driver.

5. The dust-proof mechanism as claimed in claim 1, wherein the transmission member comprises a linking lever, one end of the linking lever being connected with the driving unit and the other end of the linking lever being connected with the dust-proof plate.

* * * * *